July 1, 1969       JO MORGAN TEAGUE, JR       3,453,106
COMPOSITIONS EXHIBITING PERSISTENT INTERNAL POLARIZATION
WHERE A PHOTOCONDUCTIVE MATERIAL IS DISPERSED IN A
POLYSILOXANE RESIN DERIVED FROM
TRIFUNCTIONAL MONOMERS
Filed July 21, 1965
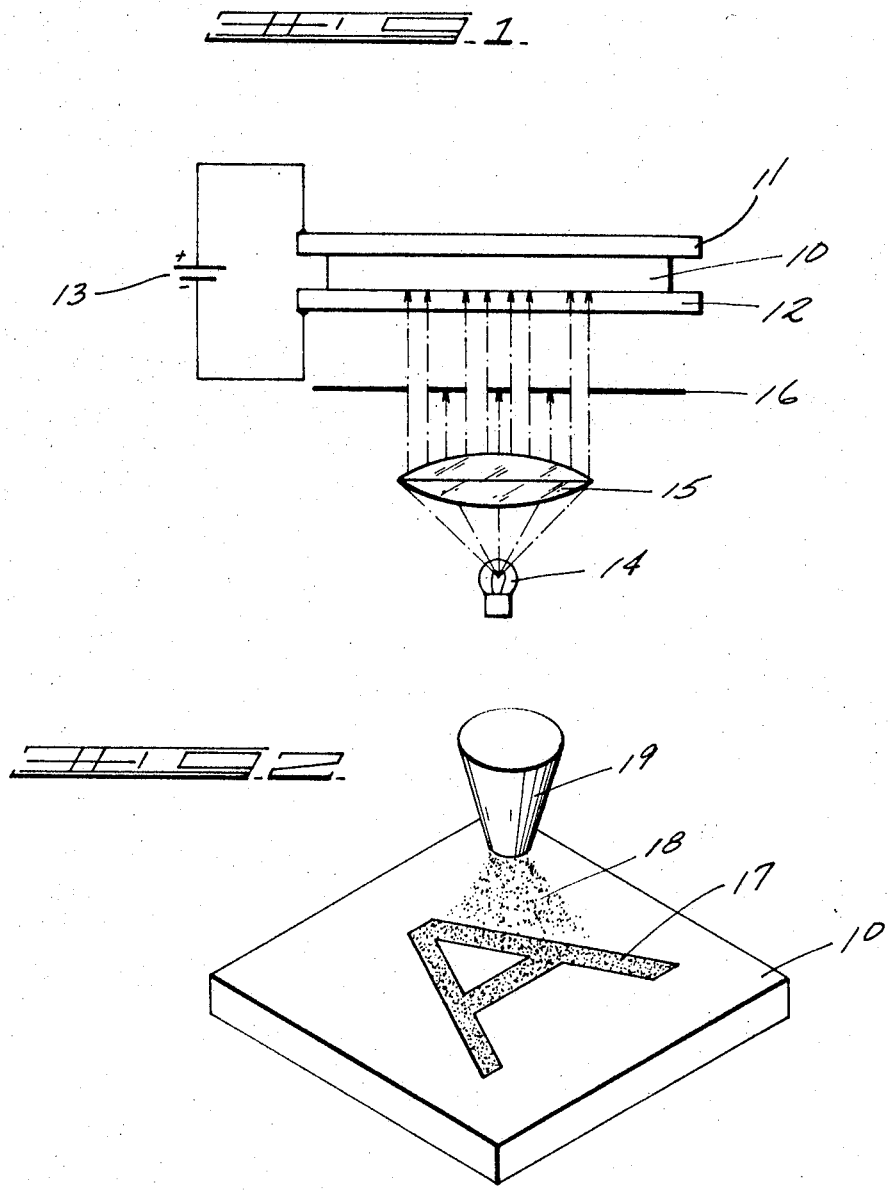
INVENTOR.
Jo Morgan Teague, Jr.
BY
W. A. Schaich &
Claron N. White
Attorneys United States Patent Office 3,453,106
Patented July 1, 1969

3,453,106
COMPOSITIONS EXHIBITING PERSISTENT INTERNAL POLARIZATION WHERE A PHOTOCONDUCTIVE MATERIAL IS DISPERSED IN A POLYSILOXANE RESIN DERIVED FROM TRIFUNCTIONAL MONOMERS
Jo Morgan Teague, Jr., Toledo, Ohio, assignor to Owens-Illinois, Inc., a corporation of Ohio
Filed June 21, 1965, Ser. No. 465,545
Int. Cl. G03g 5/08, 5/10
U.S. Cl. 96—1.5                     20 Claims

ABSTRACT OF THE DISCLOSURE

Temperature resistant memory and copying members which can record and store images are formed from thermosetting condensation products of hydrolyzable silanes containing dispersed therein photoconductive material having the property of persistent internal polarization. The thermosetting condensation product containing the photoconductive material may be cast or molded or deposited on a substrate or formed into a film layer or sheet.

---

The present invention relates in general to copying, recording and printing, and more particularly, to an improved copying member for use in copying, recording and printing devices, and to methods of making and using the copying members.

It has been recognized as a result of earlier research that electrical polarization can be induced and occurs in photoconductive phosphors in the presence of a direct current electric field which polarization persists within the phosphor after the removal of the field. Excitation and activation radiation acts on photoconductive materials of high dark resistance in a way to produce hole-electron pairs.

For example, a photon elevates an electron from the valence band to the conduction band, leaving a hole in the valence band. This reaction of a hole electron pair production by the photon is independent of whether an external electric field is applied. In the presence of an applied electric field the electron migrates through the lattice of the phosphor crystal and is trapped at a specific acceptor trap site location. The hole migrates in the opposite direction; and it is trapped at a specific donor site. Removal of the activation energy and the electric field leaves many electrons trapped at acceptor sites and holes trapped at donor sites. Such internally polarizable material is generally characterized as having two patterns of behavior (1) mobile charges are released therein as a result of excitation of the material, and (2) both positive and negative charges become localized in so-called traps or trapping sites. These traps are believed to be, at least in part, the result of metallic dopant ions in the crystalline phosphor or they may involve crystal imperfections.

Persistent polarization is believed to be due to the immobility and trapping of the electrons moving through the conduction band. Various aspects of persistent internal polarization are discussed in Kallmann et al., Physical Review, vol. 97, No. 6, March 15, 1955, pp. 1596 through 1610, inclusive, which is incorporated herein by reference.

A further study of persistent internal polarization is found in Kallmann et al., Photographic Science & Engineering, vol. 4, No. 6, November-December 1960, pp. 345 to 353, inclusive, the entirety of which is incorporated herein by reference.

Various methods of information copying, storage, recording and the like as well as the entire subject of persistent internal polarization is described in Kallmann et al., U.S. 2,972,082, the entire disclosure of which is incorporated herein by reference.

Generally, the persistent internal polarization effect can be produced by placing a photoconductive layer between the two spaced electrodes and applying a D.C. field across the layer during or very shortly after exposure to a source of activation energy. Electrons raised to the conduction band by the absorption of photons drift toward the positive electrodes. Many electrons are trapped at certain energy levels at a distance from the atoms of their origin. Thus, the photoconductive phosphor layer becomes electrically polarized by the separation of trapped charges within the crystalline structure of the phosphor. Moreover, photoconductive materials exhibiting persistent internal polarization can even be utilized for copying work in those instances where an electric field is applied to the layer during or very shortly after the layer has been exposed to activation radiation to induce the polarization. It will be understood that the electric field can be varied and the intensity of excitation energy held constant, or both can be varied.

Differences between electro-photography and persistent internal polarization photography are substantial.

In electrophotographic methods, charges are sprayed on the surface of a photoconductor layer by means of corona discharges; D.C. voltages in the range of several kilovolts are required. During the light exposure, which must be made soon after charging, the charges leak off wherever the radiation strikes.

In persistent internal polarization photography, the required polarizing voltage is small (50 to 500 v.). The picture may be taken any time before, during, or after the application of the voltage. The latent persistent internal polarization image is internal, in contrast to the surface-charge image in electrophotography. Therefore, the latent persistent internal polarization image can be protected from discharge induced by atmospheric moisture, by imbedding the phosphor in a moisture-insensitive binder.

The polarization half life, which is in the order of $10^3$ minutes or much longer, depends to some extent on the properties of the imbedding binder. Thus with a suitable binder, the charge separation can be fixed for a long time within the body of the phosphor, provided it is kept in the dark. Only an exposure to light can destroy it. Both the sensitized plate and the latent image can be stored for a very long time compared to that used in electrophotography.

Illustrative of the methods developed by others that may be used for obtaining a persistent internal polarization image in the body of a photoconductive phosphor are discussed hereinafter.

In one method the plate, layer, or copying member containing the photoconductive phosphor is exposed to radiation according to the desired pattern to be depicted. An electric field is applied across the layer during or after exposure to the radiation; e.g., light. When the light source and the field are removed, the separated charges in the exposed areas remain trapped, thus forming a latent persistent internal polarization image.

In another method the photoconductive plate or layer is uniformly polarized by exposure of the entire plate to activating radiation in an electric field. Thereafter the polarized plate or layer is subjected to an electric field of opposite polarity and, while so subjected, is exposed to radiation according to the desired pattern or image to be depicted. This functions to discharge the polarization in the exposed areas to form a latent persistent internal polarization image.

Following this recording process, the persistent internal polarization image established in each photoconductive material is preserved for extended periods of time by removing the applied field, preferably removing any surface charge and then shielding the photoconductive layer or member from external influences, principally from any incident radiation or activating radiation. Recall of the recorded data is accomplished by sensing the degree of polarization in the area of the layer in any desired sequence.

In the development procedures, the latent persistent internal polarization images can be made visible by applying to the substrate surface, dyed or pigmented powders previously electrostatically charged, which will be electrically attracted to the surface of the photoconductive layer in the desired areas. Thereafter a simple step, such as heating or exposure to solvent vapor, serves to fix the colored particles to the plate to produce the desired image.

Alternative procedures to developing may be utilized and various types of colored particles can be used. For example, colored resin powders can be used. Where it is desired to form the image on another substrate such as glass, plastic, paper and the like, the photoconductive layer having the pigment particles held thereon by electrical forces can be brought into close proximity or in contact with the printable substrate and a reverse field applied to cause the pigment particles to transfer to the printable surface. Thereupon, the usual procedures can be employed to fix the pigment particles to the substrates to form the desired image. The foregoing is intended to be merely illustrative of copying methods utilizing photoconductive phosphors exhibiting persistent internal polarization.

In producing the layer of photoconductive materials for use in devices used in the past, various materials ranging in wide characteristics have been utilized as the binder or matrx to form the photoconductive member, also called memory member, latent image member or copying member. For example, the binder material is usually a substance exhibiting satisfactorily high electrical resistance and materials as polystyrene, vinyl resin, nitrocellulose, alkyd resins, silicone resins, rubber and the like have been utilized heretofore; however, the majority of these materials have not been altogether suitable inasmuch as many of them do not have high transmission to ultraviolet or other light and many do not have satisfactory heat resistance, high dielectric constant, or adherence, or coating properties.

Accordingly, it is the object of this invention to provide an improved binder or matrix for photoconductive materials which overcomes the problems and disadvantages associated with prior binder materials.

It is a further object of this invention to provide an improved binder or matrix for photoconductive phosphor materials exhibiting persistent internal polarization.

It is a further object of the present invention to provide an improved phtoconductive composition which avoids the disadvantages of prior known compositions.

It is a further object of the present invention to provide an improved member for use in copying, recording and printing processes.

It is a further object of the present invention to provide a method for copying, recording and printing wherein the image is produced by the internal polarization of a photoconductive material dispersed in a binder or matrix therefor which overcomes the problems associated with prior methods and compositions.

It is a further object of the present invention to provide devices for copying patterns of light and shadow utilizing an improved binder or matrix containing photoconductive materials.

It is another object of the present invention to provide an improved article for use in electrophotography processes formed of a thin coating or layer of photoconductive material exhibiting persistent internal polarization on a preferably flexible web.

It is a still further object of the present invention to provide a method of making an improved binder or matrix for photoconductive materials.

In attaining the above objects, one feature of the present invention resides in a composition comprising a photoconductive material dispersed in a selected group of modified organopolysiloxanes which is a thermosetting condensation product of a hydrolyzable silicon-containing compound.

Another feature of the present invention resides in the process of forming a copying, recording and printing member from a composition comprising a photoconductive prosphor material and an organopolysiloxane which is the thermosetting condensation product of a hydrolyzable silane.

Another feature of the present invention resides in utilizing a member formed of finely divided photoconductive materials dispersed in a thermosetting organopolysiloxane in devices and process for copying, recording and printing on various substrates.

The above and other objects, features and advantages of the present invention will become apparent from the following detailed description thereof taken in conjunction with the drawing wherein:

FIG. 1 is a cross-sectional elevational view of a portion of a copying member of the present invention between two spaced electrodes.

FIG. 2 is a perspetcive view of a simple means for rendering visible the image produced in the copying member of the present invention.

With reference to FIG. 1, the copying member of the present invention 10 containing photoconductive material is spaced between two electrodes 11 and 12, connected to a source of direct current 13. Excitation energy is provided by light bulb 14 and is focused by lens 15 and impinges on said member 10 through transparent electrode 12. A pattern or stencil 16 is positioned between light source 14 and electrode 12 and permits the passage of light according to the desired configuration.

FIG. 2 shows copying member 10 having image 17 formed thereon and rendered visible by spraying with marking material 18 from dispenser 19. Excess marking material is removed by conventional means.

In carrying out the present invention, the copying member is prepared by employing as the binder material for the photoconductive materials, an organopolysiloxane which is a thermosetting, condensation product of hydrolyzable silanes including at least one compound represented by the general formula:

I. $\qquad R_nSiZ_{(4-n)}$ wherein each R independently represents a member of the group consisting of alkyl, alkenyl and aryl groups having less than seven carbon atoms, each Z independently represents a hydrolyzable group and $n$ is a positive integer with a value of 1 to 3. These polysiloxane condensation products are characterized in that they are solid thermosetting organopolysiloxane resins and have certain unique properties such as good heat stability which make them particularly suitable for use in making copying and printing members for application to hot surfaces.

Illustrative of hydrolyzable groups represented by Z in Formula I include —OH; halogen (chlorine, bromine, fluorine, iodine); alkoxy, that is, methoxy through heptoxy; acyloxy (2–6 carbon atoms); and araloxy, for example, phenoxy. In particular, alkoxy groups are preferred because their hydrolysis products are generally less acidic and therefore control of the rate of siloxy condensation is simpler. Alkoxy groups having less than 5 carbon atoms are especially advantageous and are preferred for the radical represented by Z in Formula I, as the rate of hydrolysis can be inconveniently slow when the organic hydrolyzable radical has a higher molecular weight.

Illustrative examples of groups represented by R in Formula I are alkyl such as methyl, ethyl, propyl, butyl, pentyl and hexyl and aryl such as phenyl.

More specific examples of compounds coming within the scope of Formula I will be set forth in detail hereinafter.

Monomeric starting materials of the formula $R_nSiZ_{(4-n)}$ can be prepared by a variety of procedures known to the art. For example, a convenient route involves conversion of a halide, RX, to the corresponding lithium derivative, RLi, or Grignard reagent, RMgX, followed by condensation of the organometallic reagent with a silicon tetrahalide or an alkyl orthosilicate in a suitable molar ratio. Conversion of one hydrolyzable function on silicon to another can also be readily effected. Ethanolysis and acetolysis of silicon halides are examples of such conversions.

The means selected to effect hydrolysis of the starting materials and condensation of the resultant silanols is dependent primarily upon the physical characteristics desired in the product. When liquids or films are to be prepared, hydrolysis and condensation can be carried out simply by contacting the monomer or mixture of monomers with water. Usually, however, one or more conditions designed to increase speed or homogeneity of reaction, such as stirring, elevated temperatures, addition of acid or base, use of an added solvent, are used. Viscosity of the final product can be regulated by controlling the time of reaction, use of catalysts, concentration of reactants, rate of evaporation and similar variables. The particular manner in which control of these variables will be attained will depend on the particular circumstances, and can be determined by routine experimentation according to procedures generally well known to those skilled in the art.

In general, the preparation of the organopolysiloxane comprises heating a hydrolyzable silane including at least one compound embraced by Formula I with from 1.5 to 10 moles of water for each mole of the total molar amount of the hydrolyzable silane. Heating is continued for at least one hour and up to about 10 hours or more at a temperature of at least about 50° C. while retaining at least about 1.5 moles of hydroxy-containing by-products in the reaction mass per mole of silicon-containing starting material, assuming complete hydrolysis of all the hydroxyhydrocarbyl-silicon linkages in the said reaction mass. Thereafter the temperature of the reaction mass is gradually raised to a final temperature of from about 100° C. to about 300° C. while gradually removing by volatilization alkanol and/or phenolic by-products and some water. This occurs over a time interval of at least 5 minutes. Thereafter, condensation and heating are continued in the aforesaid temperature range of from 100°–300° C. for a period short of gel or solid formation within the said temperature range. If the quantity of water is in the range of from about 1.5 moles to about 5 moles of water per mole of the hydrolyzable silane(s), the hydroxy-containing by-products, e.g. alkanols formed during hydrolysis, act as a solvent for the other products and reactants, as a resultant of which the initially heterogeneous reaction mass becomes clear and homogeneous. This homogeneity is desirable, since it prevents resin precipitation and allows more uniform control of resin formation.

The exact upper limit of the ratio of water to hydrolyzable silicon-containing monomeric material is dependent upon such influencing factors as, for example, the particular hydrolyzable silicon-containing material employed, the pH and temperature of the reaction mass, time of reaction, etc. Hence the upper limit cannot be set forth precisely, but can be determined by routine test in each case. The limits within which no addition of organic solvent is required, viz., from about 1.5 moles to about 5.0 moles of water per mole of hydrolyzable silicon-containing monomer, are preferred.

At pressures near one atmosphere, temperatures in the range of from about 50° C. to the reflux temperature of the reaction mass are useful. Temperatures much below this range require substantially longer times for reaction, and thus obviate a particularly advantageous aspect of the resin-making process, namely, its relatively high speed of operation. Also, no particular improvement in properties is attained by the use of such lower temperatures. In general, temperatures at or near the reflux temperature of the reaction mass are preferred, especially when refluxing occurs at from about 70° C. to about 90° C. Under the concentration and temperature conditions hereinbefore described, the initial hydrolysis and condensation are complete in from about 1 to about 10 hours, depending upon the particular materials and conditions used, and generally within from about 2 to 3 hours.

After initial hydrolysis and condensation under the conditions just described, controlled volatilization of the hydrolysis by-products, e.g., alkanols, and water, is effected while the reaction mass is heated to from about 100° C. to about 300° C. This relatively high (i.e., above 100° C.) temperature step is herein designated as the "precure" step.

A particularly preferred group of polymers can be prepared by (a) heating reactants consisting of a methyl trialkoxy silane of the formula:

II.

and 0 to 10 mole percent, preferably not more than 5 mole percent, based on total silane reactant, of at least one compound of the formula III.

wherein each R independently represents a monovalent radical selected from the group consisting of aryl, alkyl (including cycloalkyl), and alkenyl radicals, each of which contains less than 7 carbon atoms, and the alkoxy radical, R'O—, wherein R' represents an alkyl radical of less than 4 carbon atoms, and from 1.5 to 10 moles of water per mole of silane, for at least one hour and up to 10 hours at temperatures of at least 50° C. while retaining at least 1.5 mole of alkanol by-products in said mixture per mole of silane starting material assuming complete hydrolysis of all alkoxy-silicon linkages in said mixtures, and (b) gradually raising the temperature of the resulting mixture to a final temperature of from 100° to 300° C. while gradually removing by volatilization alkanol by-products and some water, over a time interval of at least 5 minutes, and continuing condensation and heating in the range of 100° to 300° C. for a time short of solid or gel formation in said temperature range.

Included are methyltrimethoxysilane, methyltriethoxysilane, methyltri-n-propoxysilane, and methyltriisopropoxysilane, as well as compounds with mixed alkoxy groups. Examples of coreactants embraced by Formula III (and also by Formula I, supra) include trimethylmethoxysilane, tri(1 - methylethyl)ethoxysilane, di(1 - methylpropyl)diethoxysilane, divinyldipropoxysilane, diphenyldiethoxysilane, propylpentylmethoxyethoxysilane, methylallyldi(1 - methylethoxy)silane, vinylphenyldimethoxysilane, ethyltriethoxysilane, (1 - methylethyl) - trimethoxysilane, (1,1 - dimethylethyl)tripropoxysilane, hexyltriethoxysilane, and vinyltriethoxysilane.

Comonomers embraced by Formula I and also by Formula III, if employed, can be used to modify the properties of the resins according to principles known generally to the art. Thus, comonomers containing 3 or 4 alkoxy groups act as cross-linking agents; those with 2 alkoxy groups act to increase chain length and decrease cross-linking; and those with one alkoxy group act as chain-terminating agents. In particular, inclusion of dialkoxysilanes such as dimethyldiethoxysilane can be used to diminish cross-linking and thus provide less brittle products. Inclusion of more than about 5 mole percent of alkyl orthosilicates can lead to excessive cross-linking and attendant brittleness, and quantities of other comonomers substantially above this amount may cause decreased chemical resistance.

In this embodiment, too, the concentration of water in the initial hydrolysis-condensation reaction mixture should be in the range of from about 1.5 moles to about 10 moles of water per mole of silane reactants. Likewise, the other remarks made hereinbefore with respect to resin precipitation and avoidance thereof apply to the production of a solid, machinable polysiloxane, as do also the remarks made with regard to the temperature and pressure of the reaction, and the retention of hydrolysis products (e.g., an alkanol) in the reaction mass during hydrolysis and initial condensation.

Initial hydrolysis-condensation is conveniently carried out by placing in a flask pure water, methyltrialkoxysilane, the acid content of which has been suitably adjusted, and from 0 to 10 mole percent, preferably not more than 5 mole percent, based on the total hydrolyzable silanes, of a compound of the kind embraced by Formula III. If desired or deemed necessary, these compounds may be purified. The resulting mixture is then heated under reflux conditions.

The initially cloudy reaction mixture clears on heating, usually within an hour, because the hydroxyhydrocarbon by-product, specifically alcohol, dissolves the other components of the mixture. As previously has been stated, a suitable degree of hydrolysis-condensation is usually obtained if reflux is allowed to proceed for from about 1 to 4 hours after the mixture clears.

Other conditions with respect to the permissible acid content during the initial hydrolysis-concentration step, and concerning other influencing variables have been given hereinbefore.

In making methylpolysiloxanes referred to above, as well as, for instance, (methyl)(phenyl)polysiloxanes, some alkanol or other hydrolysis by-product should be retained, as previously indicated, in the reaction mass during hydrolysis and initial condensation for the reasons previously given. To avoid gelation and effect polysiloxane formation at a conveniently rapid rate, the acidity of the initial hydrolysis-condensation reaction mixture advantageously is suitably controlled. After initial hydrolysis and condensation controlled volatilization of hydrolysis by-products and water is effected, while the temperature of the mixture is raised to temperatures in the range of 100° to 300° C., thereby to precure the resin in the manner and for the reasons previously stated.

Other techniques for preparing an organopolysiloxane include forming a mixture which comprises a precursor hydrolyzable to methylsilanetriol, a precursor hydrolyzable to phenylsilanetriol, and water. The mixture is then heated and concentrated by removing a substantial portion but not all of the volatile components, then heated above the boiling point of pure water at the prevailing pressure; and formed and heated for a period of 1 hour up to 30 days at a temperature below the boiling point of pure water at the prevailing pressure to provide a machinable, thermosetting, heat-resistant organopolysiloxane body.

A further method that provides an especially heat-resistant, machinable, thermosetting organopolysiloxane body comprises heating a mixture which comprises a hydrolyzable methyltrialkoxysilane, a hydrolyzable phenyltrialkoxysilane, and water in a relative molar ratio of at most $x:y:1.5(x+y)$, respectively, and advantageously a ratio of $x:y:3(x+y)$, respectively, wherein $x$ and $y$ are independently selected from the range of 1 to 10, inclusive, at a temperature between ambient temperature and 150° C. for a time of 1 to 10 hours; removing 50 to 90 mole percent of the alkanol by-product by volatilization; heating the reaction mixture to effect precure at a temperature within the range of from 5 centigrade degrees up to 110 centigrade degrees above the boiling point of pure water at the prevailing pressure, but usually not above 250° C., for a time up to 30 minutes; casting and then curing the resinous mixture thus obtained for at least one day at a temperature within 10 centigrade degrees below the boiling point of pure water at the prevailing pressure, then at a temperature increasing continually up to a maximum of up to 350° C. over a period of from 2 to 30 days, and finally allowing the sample to return slowly to ambient temperature over a time of from 1 to 12 hours.

A preferred procedure comprises heating at reflux temperature, for from 2 to 4 hours, a reaction mixture which comprises methyltriethoxysilane, phenyltriethoxysilane, and water in a relative molar ratio of at most $$x:y:1.5(x+y)$$

respectively, and advantageously a ratio of $x:y:3(x+y)$, respectively; in other words, on a molar basis the ratio of water to the sum of $x+y$ is a minimum of 1.5 and advantageously is 3. The values $x$ and $y$ are independently selected from the range of 1 to 5, inclusive. Additional steps in the preferred procedure include distilling 70 to 80 mole percent of 95% ethanol by-product from the reaction mixture, subjecting the distillation residue to a precure at 110° to 200° C. for a time up to 10 minutes at ambient pressures; and finally casting and then curing the resulting resinous mixture at 25° to 95° C. and at about atmospheric pressure for a time of from one day to one week to give a machinable, thermosetting, heat-resistant organopolysiloxane body.

The initial reaction mixture of this procedure optionally contains an acidic or basic catalyst, although the hydrolysis and subsequent condensation normally proceed at a convenient rate without them. To avoid premature gelation of the resins the quantity of acid or base in the reaction mixture must be below 0.01 mole of acid or base per mole of hydrolyzable silanol precursor. Similarly, a solvent, e.g., ethanol, can be added to render the reaction mixture homogeneous.

The initial reaction mixture also may contain precursors of methylsilanetriol and phenylsilanetriol in the above-defined ratios and 0 to 10 mole percent, usually 0 to 5 mole percent of a co-reactant which, when present, usually comprises at least 1 mole percent of the mixture. (The aforementioned mole percentages are based on the hydrolyzable silane components of the initial mixture.) The aforesaid co-reactant comprises at least one compound of the formula IV. 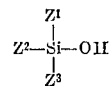

wherein $Z^1$, $Z^2$ and $Z^3$ represent monovalent hydrocarbon radicals independently selected from the group consisting of aryl, alkyl (including cycloalkyl) and alkenyl radicals, each of which contains less than 7 (i.e., 1–6) carbon atoms, and the hydroxyl radical. Examples of such co-reactants are trimethylsilanol, tri(1-methylethyl)silanol, trihexylsilanol, di(1 - methylpropyl)silanediol, divinylsilanediol, diphenylsilanediol, propylpentylsilanediol, methylallylsilanediol, vinylphenylsilanediol, ethylsilanetriol, 1-methylethylsilanetriol, 1,1-dimethylethylsilanetriol, 2,2-dimethylpropylsilanetriol, hexylsilanetriol, and vinylsilanetriol. These co-reactants can be added to the reaction mixture in the form of their precursors of the formula V. 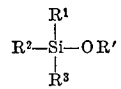

wherein $R^1$, $R^2$ and $R^3$ represent monovalent hydrocarbon radicals independently selected from the group consisting of aryl, alkyl (including cycloalkyl) and alkenyl radicals, each of which contains less than 7 carbon atoms, and the alkoxy radical R'O—, wherein R' has the meaning previously defined. Examples of such precursors are trimethylmethoxysilane, tri(1-methylethyl)ethoxysilane, trihexyl(1,1 - dimethylethoxy)silane, tricyclopentylmethoxysilane, di(1 - methylpropyl)diethoxysilane, divinyldipropoxysilane, diphenyldiethoxysilane, propylpentylmethoxyethoxysilane, methylallyldi(1-methylethoxy)silane, vinylphenyldimethoxysilane, ethyltriethoxysilane, (1 - methylethyl)trimethoxysilane, (1,1-dimethylethyl)tripropoxysilane, (2,2-dimethylpropyl)tributoxysilane, hexyltriethoxysilane, and vinyltriethoxysilane.

A further variation in the procedure can be achieved by hydrolyzing individually a hydrolyzable methyltrialkoxysilane and a hydrolyzable phenyltrialkoxysilane and then combining the resulting organopolysiloxyanes to form the initial reaction mixture described above. The resulting resinous mixture ultimately yields, by the method described, a machinable, thermosetting, heat-resistant organopolysiloxane body.

Resinous products produced by the foregoing procedures are machinable, heat-resistant bodies comprising or consisting essentially of the siloxnae condensation product of methylsilanetriol and phenylsilanetriol, in a molar ratio of from 1:10 to 10:1 (preferably from 1:5 to 5:1), respectively, and into which also may be incorporated, e.g., by co-condensation of the later-named diol with the methylsilanetriol and phenylsilanetriol, from 0 to 10 (preferably from 0 to 5) mole percent of the siloxane condensation product of diphenylsilanediol.

It will be understood, of course, by those skilled in the art that the silanols mentioned in the preceding paragraph, as well as the foregoing and others set forth elsewhere in the specification and in the appended claims, need not be preformed in making the siloxane condensation product. The aforementioned silanols employed therefore include both those which can be preformed (that is, prepared and isolated prior to undergoing a condensation reaction to form an organopolysiloxane) as well as those which are transitory (that is, incapable of being isolated in pure or substantially pure form as such before condensing to form siloxane linkages).

Various photoconductive substances can be dispersed in the above described resin binder to obtain copying members according to the present invention. Such photoconductive materials are well known in the art. Preferably the photoconductive materials possess a high resistivity in the dark. In general a material in considered a photoconductive insulator suitable for the purposes of the present invention if it shows a resistivity in the dark of about $10^9$ ohm-cm., although this can vary depending on the particular use intended. As explained earlier, photoconductivity requires the ability to make electron transitions to the conduction band upon the absorption of a photon of light. In general, certain definite physical properties generally are associated with materials possessing the ability referred to hereinabove. Generally, the photoconductive materials can be classified as either inorganic or organic. The inorganic photoconductive insulating phosphor materials are characterized by having electrons in the non-conductive energy level activated by illumination to a different energy level whereby an electric charge is free to migrate under an applied electric field.

Examples of inorganic photoconductive phosphors include zinc oxide, zinc sulfide, zinc cadmium sulfide, zinc magnesium oxide, zinc cadmium tellurides, cadmium selenide, zinc silicate, cadmium strontium sulfide and alkaline earth sulfides. Organic photoconductive substances such as anthracene may also be used.

Any suitable technique can be used for incorporating the photoconductive materials into the organopolysiloxane resin. In some instances, it may be advantageous to mix the phosphor with the starting materials prior to hydrolysis and condensation to an organopolysiloxane.

The phosphor can be admixed with the liquid, semisolid or solid organopolysiloxane at any stage in their preparation or after the organosiloxane has been formed, however, prior to the curing of the resin. The quantity of inorganic phosphor material that is added to the organopolysiloxane is not particularly critical, although a sufficient amount is added so as to provide a complete and uniform dispersion throughout the matrix. Generally, the weight ratio of photoconductive material to binder ranges from about 10:1 to about 0.5:1 although these ranges can vary.

After the phosphor material is added to the organopolysiloxane and cast or otherwise shaped in the mold or deposited as a coating on the substrate, cast as a self-sustaining film, sheet or layer or other similar or equivalent action, the resin is cured. Crosslinking and some linear polymerization properly proceed at this stage since the resin becomes increasingly hard.

A more specific embodiment of the method features of the present invention is directed to a method of producing an improved matrix composition which comprises:

A. Hydrolyzing a hydrolyzable silane including at least one compound represented by the general formula

$$R_nSiZ_{(4-n)}$$

wherein each R independently represents a member of the group consisting of alkyl, alkenyl and aryl radicals having less than 7 carbon atoms, each Z independently represents a hydrolyzable group, and $n$ represents a positive integer less than 4;

B. Condensing the hydrolysis product to yield a heat-curable organopolysiloxane;

C. Partly curing the heat-curable organopolysiloxane;

D. Adding to the partly cured organopolysiloxane in liquid state, the photoconductive material in solution or finely divided condition in an amount effective in imparting the desired characteristics to the cured organopolysiloxane composition;

E. Mixing the resulting mass to form a homogeneous admixture; and

F. Completing the cure of the partly cured organopolysiloxane in the presence of the said photoconductive material.

Taking as an example the production of a cast resin to obtain a hard, machinable, heat-resistant body, the final cure of such a resin can be carried out, if desired, at room temperature (20°–30° C.) or lower merely by allowing the cast resin to remain undisturbed.

Although the final cure may be effected without added heat, a more convenient procedure involves heating the precured, organopolysilane resin at about 90° C. for varying time intervals, e.g., for from about 1 to 3 days, or sometimes longer, for instance up to 7 days. The final stages of cure can also be carried out at temperatures above 100° C. after a cure at 90° C. has brought the resin to a substantially hard condition.

Interposed between step (E) and (F) above, the curable composition may be coated on a suitable substrate. As referred to previously, one important aspect of the present invention resides in applying the composition to a flexible web such as paper after which the composition is cured. Coated paper produced in this manner is particularly valuable as copying paper in duplicating apparatus replying on the photoconductive material for the image formation, such as, but not limited to, such material that has the property of persistent internal polarization which can be utilized.

The following example will serve to illustrate the preparation of the organopolysiloxane polymers containing phosphor materials but are not considered limiting of the invention in any manner.

EXAMPLE I

A. Preparation of an organopolysiloxane

A 250-ml. three-necked flask was equipped with a thermometer, magnetic stirrer and condenser. The condenser was provided with a take-off to allow reflux or distillation. In the thusly-equipped flask 94 ml. (0.5 mole) of methyltriethoxysilane, 60 ml. (0.25 mole) of phenyltriethoxysilane and 40.5 ml. (2.25 moles) of water were charged. The resulting two-phase mixture was heated to about 80° C. After heating for about 5 minutes at this temperature a one-phase system was formed. This single-phase reaction mass was heated under reflux with stirring for 4 hours. At the end of this time about 80% of the theoretical amount of by-product ethanol was recovered as a distillate. The residual liquid organopolysiloxane contained about 60% by weight of solids. The organopolysiloxane therein, which had an average molecular weight of about 86.5, may be represented in its completely condensed state by the formula $$[(CH_3)0.67(C_6H_5)0.33Si1.0O1.5]n$$

The aforementioned residue of liquid organopolysiloxane resin was transferred to a 300-ml. beaker in which it was heated with stirring to 140° C. to effect precure. It was held only momentarily at 140° C. A clear, viscous, incompletely condensed resin resulted.

B. Incorporation of zinc oxide in an organopolysiloxane resin

To 74 grams of precured resin (about ½ mole prior to precure to 140° C.) dissolved in ethanol (50 ml.) and cooled to 75° C. was added finely divided zinc oxide.

The resulting composition was thoroughly mixed to obtain a homogeneous liquid mass, after which a glass slide was dipped therein to provide a coating thereon. The mixture was then precured again by heating to 120° C. After this second precure a second glass slide was coated by dipping in the hot, liquid resin, and castings were made by pouring samples into small circular aluminum pans wherein discs are formed when the resin was fully cured.

The samples were placed in a 90° C. oven for 48 hours. At the end of this period of time the coatings on the slides and the discs were hard.

While the foregoing example illustrates the preparation of a suitable composition utilizing zinc oxide as the phosphor and a specific copolymer as the resinous binder, it is understood that any of the aforementioned phosphor materials can be incorporated therein with satisfactory results. Similarly, other siloxane resins coming within the scope of the present invention can also be substituted therein with equally satisfactory results. Because of the excellent high temperature stability, high dielectric constant and excellent ultraviolet transmission, the thermosetting resins described hereinabove function as superior copying members.

It is to be understood that the photoconductive compositions of the present invention can be used in a wide variety of devices utilizing the phenomenon of persistent internal polarization. For example, layers, sheets and films of the photoconductive composition are of particular usefulness in recording and printing devices wherein the items to be recorded are stored directly in the form of variations in the degree of persistent internal polarization occurring from region to region in the layer. The persistent internal polarization in the layer can be preserved for extended periods of time by isolating the layer from incident excitation radiation. Various examples of alternative methods of recording, storage and recall are given in U.S. 2,972,082, the entire disclosure of which is incorporated herein by reference and it is understood that the resinous binder of the present invention can be utilized in any of the systems described therein. For example, the photoconductive compositions of the present invention can be uniformly polarized by subjecting the entire composition in the form of a layer, sheet, film or the like to uniform incident activation energy. Thereafter, the polarization can be selectively neutralized according to any desired pattern of light and darkness to form a latent image in the layer. Application of an electrical field wil cause the electron hole pairs to migrate and the electrons will be held in the deep trapping sites so that the induced polarization according to the desired pattern or configuration can be stored for a period of time. Thereafter, the pigmentation material can be deposited on the layer and will be selectively held in position according to the persistent internal polarization image in the layer. Thereafter, the layer can be used to print on other surfaces by reversing the electric field and depositing the pigmented material on another substrate.

An alternative procedure is to polarize the layer according to a specific pattern blocking out a desired image in light and darkness so as to develop polarization within the layer. Thereafter, the deposition of colored particles can take place according to conventional procedures.

Photoconductive compositions of the present invention are particularly valuable for coating on various substrates so as to enable direct printing on the coated surface without going through an intermediate transfer stage. For example, the photoconductive composition may be coated or applied to a flexible web such as paper, cloth, or other webs and thereafter cured. Paper coated in this manner is a useful device for use as the copying paper in office copying or as a photographic paper in electrophotography. Similarly the photoconductive compositions can be coated on various other substrates such as glass to form a memory or copying member.

It is to be understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A temperature resistant memory member for use in copying devices wherein said member is capable of recording and storing images therein comprising photoconductive material having the property of persistent internal polarization and having a high dark resistivity dispersed in an organo-polysiloxane thermosetting resin produced by hydrolyzing at least one silane represented by the structural formula:

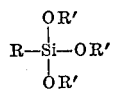

wherein R is a methyl or phenyl group and R' is an alkyl group of less than 4 carbon atoms with at least 1.5 moles of water per mole of silane and heating to a temperature of at least 100° C.

2. A member as defined in claim 1 wherein the polymer is a copolymer of methyltriethoxysilane and phenyltriethoxysilane in the molar ratio of monomers of 2 to 1, respectively.

3. A member as defined in claim 1 wherein the polymer is a homopolymer of methyltriethoxysilane.

4. A member as defined in claim 1 wherein the polymer is a homopolymer of ethyltriethoxysilane.

5. In the member as defined in claim 1 wherein the photoconductive material is zinc oxide.

6. In the member as defined in claim 1 wherein the phosphor is zinc cadmium sulfide.

7. In the member as defined in claim 1 wherein the phosphor is zinc cadmium selenide.

8. In the member as defined in claim 1 wherein the phosphor is zinc cadmium telluride.

9. In a temperature resistant, memory member comprising crystalline photoconductive phosphors exhibiting persistent internal polarization dispersed in a binder, said member being used in copying, recording, storage and printing devices wherein a source of activation energy impinging on said member containing said phosphors causes the production of electron-hole pairs and an applied electric field causes the migration and trapping of electrons in deep trapping sites, the improvement wherein the binder fo said phosphors is an organopolysiloxane resin which is produced by hydrolyzing at least one silane represented by the structural formula:

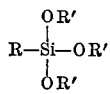

wherein R is methyl or phenyl and R' is an alkyl group of less than 4 carbon atoms and from 0 to 10 mole percent of at least one silane represented by the formula:

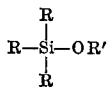

wherein R is aryl, alkyl or alkenyl, each of which contain less than 7 carbon atoms, and R' is alkyl of less than 4 carbon atoms, with at least about 1.5 moles water per mole of silane, heating for at least 1 hour at a temperature of at least about 50° C., and thereafter heating to a temperature of at least about 100° C.

10. In a process for recording a pattern of light and dark comprising exposing a copying member comprising a photoconductive material dispersed in a binder to activating radiation according to the pattern of light and dark to be recorded and subsequently depositing marking material on said member to render said pattern visible, the improvement which comprises employing as said binder an organopolysiloxane resin which is produced by hydrolyzing at least one silane represented by the structural formula:

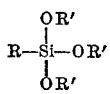

wherein R is a methyl or phenyl group and R' is an alkyl group of less than 4 carbon atoms with at least 1.5 moles of water per mole of silane and heating to a temperature of at least 100° C.

11. A photoconductive member for use in copying devices for recording patterns of light and dark comprising a photoconductive phosphor dispersed in a binder formed of a thermosetting organopolysiloxane which is produced by hydrolyzing at least one silane represented by the structural formula:

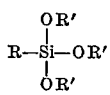

wherein R is a methyl or phenyl group and R' is an alkyl group of less than 4 carbon atoms with at least 1.5 moles of water per mole of silane and heating to a temperature of at least 100° C.

12. The method of producing a photoconductive composition suitable for use as a copying member in copying devices which comprises hydrolyzing at least one silane represented by the structural formula:

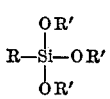

wherein R is a methyl or phenyl group and R' is an alkyl group of less than 4 carbon atoms with at least 1.5 moles of water per mole of silane and heating to a temperature of at least 100° C., whereby the hydrolysis product is condensed to yield a heat-curable organopolysiloxane; partly curing the heat-curable organopolysiloxane; adding to the partly cured organopolysiloxane a photoconductive material in a sufficient amount; mixing the resulting liquid mass to form a homogeneous admixture; and completing the cure of the partly cured organopolysiloxane in the presence of said photoconductive material.

13. In a device for recording patterns of light and dark in the form of a persistent internal polarization image in a member comprising at least two spaced electrodes and a member positioned therebetween and containing dispersed therein a photoconductive material, the improvement wherein the member is formed from a thermosetting organopolysiloxane which is produced by hydrolyzing at least one silane represented by the structural formula:

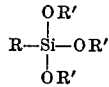

wherein R is a methyl or phenyl group and R' is an alkyl group of less than 4 carbon atoms with at least 1.5 moles of water per mole of silane and heating to a temperature of at least 100° C.

14. An article comprising a flexible web as a substrate having applied thereto a uniform coating of a photoconductive composition comprising a photoconductive material having the property of persistent internal polarization and having a high dark resistivity dispersed in an organopolysiloxane thermosetting resin produced by the hydrolysis and condensation in the presence of water of at least one hydrolyzable silane compound represented by the structural formula:

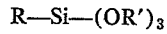

wherein R is methyl or phenyl and R' is an alkyl group having less than 4 carbon atoms.

15. An article as defined in claim 14 wherein the flexible web substrate is paper.

16. An article as defined in claim 14 wherein said flexible web substrate is cloth.

17. A self sustaining film formed of a photoconductive composition comprising a photoconductive material having the property of persistent internal polarization and having a high dark resistivity dispersed in an organopolysiloxane thermosetting resin produced by the condensation of at least one hydrolyzable compound represented by the structural formula:

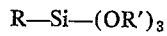

wherein R represents methyl or phenyl and R' is alkyl having less than 4 carbon atoms.

18. An article for use in copying devices comprising a substrate coated with a thin layer of a heat resistant photoconductive composition comprising a photoconductive material having the property of persistent internal polarization and having a high dark resistivity dispersed in an organopolysiloxane thermosetting resin produced by hydrolyzing at least one silane represented by the structural formula:

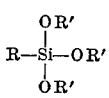

wherein R is methyl or phenyl and R' is an alkyl group of less than 4 carbon atoms and from 0 to 10 mole percent of at least one silane represented by the formula:

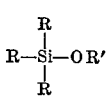

wherein R is aryl, alkyl or alkenyl, each of which contain less than 7 carbon atoms, and R' is alkyl of less than 4 carbon atoms, with at least about 1.5 moles water per mole of silane, heating for at least 1 hour at a temperature of at least about 50° C., and thereafter heating to a temperature of at least about 100° C.

19. In the article as defined in claim 18 wherein the substrate is glass.

20. In the article as defined in claim 18 wherein the substrate is paper.

References Cited

UNITED STATES PATENTS

| | | | |
|---|---|---|---|
| 3,081,165 | 3/1963 | Ebert | 96—1 |
| 3,121,006 | 2/1964 | Middleton et al. | 96—1 |
| 3,132,941 | 5/1964 | Stahly et al. | 96—1 |
| 3,155,504 | 11/1964 | Damm et al. | 96—1 |
| 3,354,095 | 11/1967 | Burzynski et al. | 252—316 |
| 3,257,330 | 6/1966 | Burzynski | 252—316 |
| 3,274,288 | 9/1966 | Harris et al. | 260—825 |
| 3,348,944 | 10/1967 | Michalchik | 96—1.8 |

NORMAN G. TORCHIN, *Primary Examiner.*

JOHN C. COOPER, *Assistant Examiner.*

U.S. Cl. X.R.

96—1, 1.8; 117—161; 260—37, 46.5